US012045637B2

(12) United States Patent
Narayanan et al.

(10) Patent No.: US 12,045,637 B2
(45) Date of Patent: Jul. 23, 2024

(54) PROVIDING ASSISTIVE USER INTERFACES USING EXECUTION BLOCKS

(71) Applicant: Google LLC, Mountain View, CA (US)

(72) Inventors: Ajit Narayanan, Mountain View, CA (US); Ken Goldman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 17/634,519

(22) PCT Filed: Oct. 1, 2019

(86) PCT No.: PCT/US2019/054159
§ 371 (c)(1),
(2) Date: Feb. 10, 2022

(87) PCT Pub. No.: WO2021/066818
PCT Pub. Date: Apr. 8, 2021

(65) Prior Publication Data
US 2022/0300307 A1 Sep. 22, 2022

(51) Int. Cl.
G06F 9/451 (2018.01)
G06F 3/0484 (2022.01)
G06F 9/54 (2006.01)

(52) U.S. Cl.
CPC ............ G06F 9/453 (2018.02); G06F 3/0484 (2013.01); G06F 9/54 (2013.01)

(58) Field of Classification Search
CPC .......... G06F 9/453; G06F 3/0484; G06F 9/54; G06F 9/451
See application file for complete search history.

(56) References Cited

U.S. PATENT DOCUMENTS 2,006,015 A1 1/2006 Chaudhri et al.
2003/0086481 A1 5/2003 Sih et al.
(Continued)

FOREIGN PATENT DOCUMENTS

CN 102279791 8/2016
CN 105830150 8/2016
(Continued)

OTHER PUBLICATIONS

"Communication pursuant to Article 94(3) EPC in EP Application No. 19791024.3", Jun. 2, 2022, 4 pages.
(Continued)

Primary Examiner — Kieu D Vu
Assistant Examiner — Alvaro R Calderon, IV
(74) Attorney, Agent, or Firm — IP Spring

(57) ABSTRACT

Implementations described herein relate to methods, systems, and computer-readable media to provide an assistive user interface. In some implementations, a computer-implemented method to provide an assistive user interface includes identifying a user journey that includes a plurality of operations to perform a computer-mediated task by analyzing data comprising user interaction data. The method further includes analyzing one or more of application programming interface (API) definitions of a plurality of software applications or user interface (UI) elements of the plurality of software applications to identify a plurality of executable units. The method further includes generating an execution block that defines a sequence of two or more of the plurality of executable units based on the user journey and the plurality of executable units. Execution of the execution block completes the computer-mediated task. The method further includes providing an assistive user interface that includes the execution block.

17 Claims, 8 Drawing Sheets

(56) References Cited

U.S. PATENT DOCUMENTS

| | | | |
|---|---|---|---|
| 2005/0246726 A1* | 11/2005 | Labrou | G06F 9/465 |
| | | | 719/328 |
| 2011/0131513 A1 | 2/2011 | Yamamoto | |
| 2013/0086481 A1 | 4/2013 | Balasaygun | |
| 2013/0139113 A1 | 5/2013 | Choudhary et al. | |
| 2013/0246920 A1* | 9/2013 | Fields | G06F 9/44 |
| | | | 715/728 |
| 2015/0067503 A1* | 3/2015 | Slayton | G06F 9/453 |
| | | | 715/708 |
| 2015/0067531 A1 | 3/2015 | Adimatyam et al. | |
| 2015/0215350 A1* | 7/2015 | Slayton | G06F 9/453 |
| | | | 709/204 |
| 2017/0068550 A1* | 3/2017 | Zeitlin | G10L 15/285 |
| 2017/0358304 A1* | 12/2017 | Castillo Sanchez | G10L 15/22 |
| 2019/0066677 A1* | 2/2019 | Jaygarl | G06F 40/30 |
| 2019/0235916 A1* | 8/2019 | Min | G06F 3/048 |
| 2019/0370292 A1* | 12/2019 | Irani | G06F 3/0482 |
| 2019/0371316 A1* | 12/2019 | Weinstein | H04L 51/18 |
| 2019/0371317 A1* | 12/2019 | Irani | G10L 15/22 |
| 2019/0373102 A1* | 12/2019 | Weinstein | G06F 3/0482 |
| 2020/0097247 A1* | 3/2020 | Molina | G06F 16/2455 |
| 2020/0150983 A1* | 5/2020 | Ng | H04L 67/61 |
| 2020/0184961 A1* | 6/2020 | Rohatgi | G06Q 10/103 |
| 2020/0356243 A1* | 11/2020 | Meyer | G06F 9/4881 |
| 2020/0379726 A1* | 12/2020 | Blatz | G06F 9/451 |
| 2020/0379727 A1* | 12/2020 | Blatz | G06F 3/048 |
| 2022/0284901 A1* | 9/2022 | Novitchenko | G10L 15/22 |

FOREIGN PATENT DOCUMENTS

| | | |
|---|---|---|
| CN | 106657625 | 5/2017 |
| CN | 107077287 | 8/2017 |
| CN | 107666523 | 2/2018 |
| CN | 107871501 | 4/2018 |
| CN | 108566334 | 9/2018 |
| CN | 108710795 | 10/2018 |
| CN | 109474735 | 3/2019 |
| CN | 110035171 | 7/2019 |
| KR | 20130058947 | 6/2013 |
| WO | WO 2019125492 | 6/2019 |

OTHER PUBLICATIONS

"International Preliminary Report of Patentability in PCT/US19/054159", Apr. 14, 2022, 9 Pages.
"First Examination Report in IN Application No. 202127057595", May 6, 2022, 6 pages.
https://www.facebook.com/ashleysmominc/videos/1493199734028815, Feb. 10, 2022.
International Search Report and Written Opinion in International Application No. PCT/US2019/054159, Jun. 12, 2020.
"Action(s) Your personal automation assistant", accessed on Oct. 2, 2019; https://app.jbbres.com/actions/, 3 pages.
"Automator User Guide", for macOS Mojave; accessed on Oct. 2, 2019; https://support.apple.com/en-in/guide/automator/welcome/mac, 2 pages.
"Tasker—Total Automation for Android", accessed on Oct. 2, 2019; https://tasker.joaoapps.com/, 3 pages.
Annie Dossey, "Top 5 iOS 12 features to consider for your mobile app", Sep. 25, 2018, 6 Pages.
"First Office Action in Chinese Application No. 201980097694.6", Jul. 14, 2023, 11 pages.
EPO, Communication Pursuant to Article 94(3) EPC for European Patent Application No. 19791024.3, Oct. 13, 2023, 4 pages.
CNIPA, Notice of Allowance for Chinese Patent Application No. 201980097694.6, Jan. 23, 2024, 7 pages.

* cited by examiner

PROVIDING ASSISTIVE USER INTERFACES USING EXECUTION BLOCKS

RELATED APPLICATIONS

This application is a § 371 national stage of PCT International Application No. PCT/US19/54159, filed Oct. 1, 2019, entitled, "Providing Assistive User Interfaces Using Execution Blocks", which is incorporated herein by reference in its entirety.

BACKGROUND

User computing devices such as phones, tablets, laptop and desktop computers, wearable devices, smart speakers, smart appliances, in-car devices, etc. include functionality for users to play entertainment, work on documents, make financial transactions, engage in social interaction, navigate to a destination, etc. Such functionality is provided by various software applications, provided on the user computing device and/or a server accessed from a user computing device.

Many computer-mediated tasks necessitate that the user perform operations using a user computing device, e.g., to navigate a user interface by providing selection input; to provide text, audio, and/or image input; etc. Many tasks also necessitate that the user interact with multiple software applications, each with a respective user interface, or that the user interact with multiple user computing devices. Such user interaction may require the user to possess certain cognitive and/or motor skills.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media to provide an assistive user interface. In some implementations, a computer-implemented method to provide an assistive user interface includes identifying a user journey that includes a plurality of operations to perform a computer-mediated task by analyzing data comprising user interaction data. The method further includes analyzing one or more of application programming interface (API) definitions of a plurality of software applications or user interface (UI) elements of the plurality of software applications to identify a plurality of executable units. The method further includes generating an execution block that defines a sequence of two or more of the plurality of executable units based on the user journey and the plurality of executable units. Execution of the execution block completes the computer-mediated task. The method further includes providing an assistive user interface that includes the execution block.

In some implementations, the method further includes receiving user input indicative of activation of the execution block and in response to the user input, running the execution block. In some implementations, the method further includes providing a prompt to request a parameter for a particular executable unit of the sequence and receiving a user response that includes the parameter.

In some implementations, the assistive user interface is provided by a virtual assistant application, and wherein execution of the execution block comprises invoking, by the virtual assistant application, respective software applications associated with each of the two or more of the plurality of executable units. In some implementations, the invoking comprises performing, by the virtual assistant application, an API call using the API definitions of the respective software applications. In some implementations, the invoking comprises, automatically navigating, by the virtual assistant application, a user interface provided by the respective software applications. In some implementations, automatically navigating the user interface includes recognizing the user interface provided by the respective software applications and based on the recognizing, automatically providing one or more of a click input, a touch input, a voice input, or a keyboard input to the respective software applications.

In some implementations, generating the execution block comprises mapping each of the plurality of operations of the user journey to particular executable units of the plurality of executable units.

In some implementations, analyzing the API definitions of the plurality of software applications includes obtaining semantic annotations associated with each API definition. In these implementations, the method further includes mapping an API associated with the API definition to a particular executable unit of the plurality of executable units based on the semantic annotations.

In some implementations, analyzing the UI elements of the plurality of software applications includes mapping each UI element to a particular executable unit of the plurality of executable units. In some implementations, the UI elements include display UI elements. In these implementations, analyzing the display UI elements includes recognizing one or more of a shape, a size, a placement, a text, or a graphical content of each display UI element. In these implementations, the method further includes matching the display UI element to the particular executable unit based on the recognition of the shape, size, placement, text, or graphical content of the display UI element.

In some implementations, the UI elements include audio UI elements. In these implementations, analyzing the UI elements includes utilizing speech recognition techniques to detect one or more of a tone of the audio UI element or a text of the audio UI element. In these implementations, the method further includes matching the audio UI element to the particular executable unit based on the tone or the text.

In some implementations, the user interaction data includes a plurality of user interaction events, and analyzing the user interaction data includes classifying the plurality of user interaction events into a plurality of event clusters. In these implementations, the method further includes mapping each of the plurality of user interaction events to a particular executable unit of the plurality of executable units based on the plurality of event clusters. In some implementations, the plurality of user interaction events includes a start event indicative of a start of the computer-mediated task and an end event indicative of an end of the computer-mediated task. In some implementations, the plurality of user interaction events include at least one event associated with each of a first software application and a second software application of the plurality of software applications.

In some implementations, the assistive user interface assistive user interface further includes one or more other execution blocks each associated with a respective computer-mediated task. In these implementations providing the assistive user interface includes determining a use context based on one or more of system state of a client computing device or patterns of use associated with the client computing device. In these implementations, providing the assistive user interface further includes determining that the computer-mediated task and the respective computer-mediated tasks match the use context of the computing device.

Some implementations include a computing device that includes a processor and a memory coupled to the processor. The memory has instructions stored thereon that, when executed by the processor, cause the processor to perform operations that include identifying a user journey that includes a plurality of operations to perform a computer-mediated task by analyzing data comprising user interaction data. The operations further include analyzing one or more of application programming interface (API) definitions of a plurality of software applications or user interface (UI) elements of the plurality of software applications to identify a plurality of executable units. The operations further include generating an execution block that defines a sequence of two or more of the plurality of executable units based on the user journey and the plurality of executable units. Execution of the execution block, e.g., by the processor, completes the computer-mediated task. The operations further include providing an assistive user interface that includes the execution block.

In some implementations, the operation of analyzing the API definitions of the plurality of software applications includes obtaining semantic annotations associated with each API definition of the API definitions and mapping an API associated with the API definition to a particular executable unit of the plurality of executable units based on the semantic annotations.

In some implementations, the user interaction data includes a plurality of user interaction events. In these implementations, the operation of analyzing the user interaction data includes classifying the plurality of user interaction events into a plurality of event clusters. The operation of analyzing the user interaction data further includes mapping each of the plurality of user interaction events to a particular executable unit of the plurality of executable units based on the plurality of event clusters.

In some implementations, the computing device is a server and the assistive user interface further includes one or more other execution blocks each associated with a respective computer-mediated task. In these implementations providing the assistive user interface includes causing the assistive user interface to be displayed by a client computing device, different from the server; determining a use context of the client computing device based on one or more of system state of the client computing device or patterns of use associated with the client computing device; and determining that the computer-mediated task and the respective computer-mediated tasks match the use context of the client computing device.

Some implementations include a non-transitory computer-readable medium with instructions stored thereon that, when executed by a processor, cause the processor to perform operations that include identifying a user journey that includes a plurality of operations to perform a computer-mediated task by analyzing data comprising user interaction data. The operations further include analyzing one or more of: application programming interface (API) definitions of a plurality of software applications or user interface (UI) elements of the plurality of software applications to identify a plurality of executable units. The operations further include generating an execution block that defines a sequence of two or more of the plurality of executable units based on the user journey and the plurality of executable units. Execution of the execution block completes the computer-mediated task. The operations further include providing an assistive user interface that includes the execution block. In some implementations, the operation of generating the execution block includes mapping each of the plurality of operations of the user journey to particular executable units of the plurality of executable units.

DETAILED DESCRIPTION

Implementations described herein relate to creation and use of execution blocks that include a sequence of executable units that enable a user to perform specific computer-mediated tasks, without interacting with individual software applications that may include functionality to perform various operations associated with the computer-mediated tasks. In different implementations, execution blocks may simplify user interaction with a computing device by reducing the need for a user to make choices, reducing information density of the user interface, and standardization of user interface. Execution blocks may be provided via an assistive user interface, which may be provided by a virtual assistant.

Figure 1:
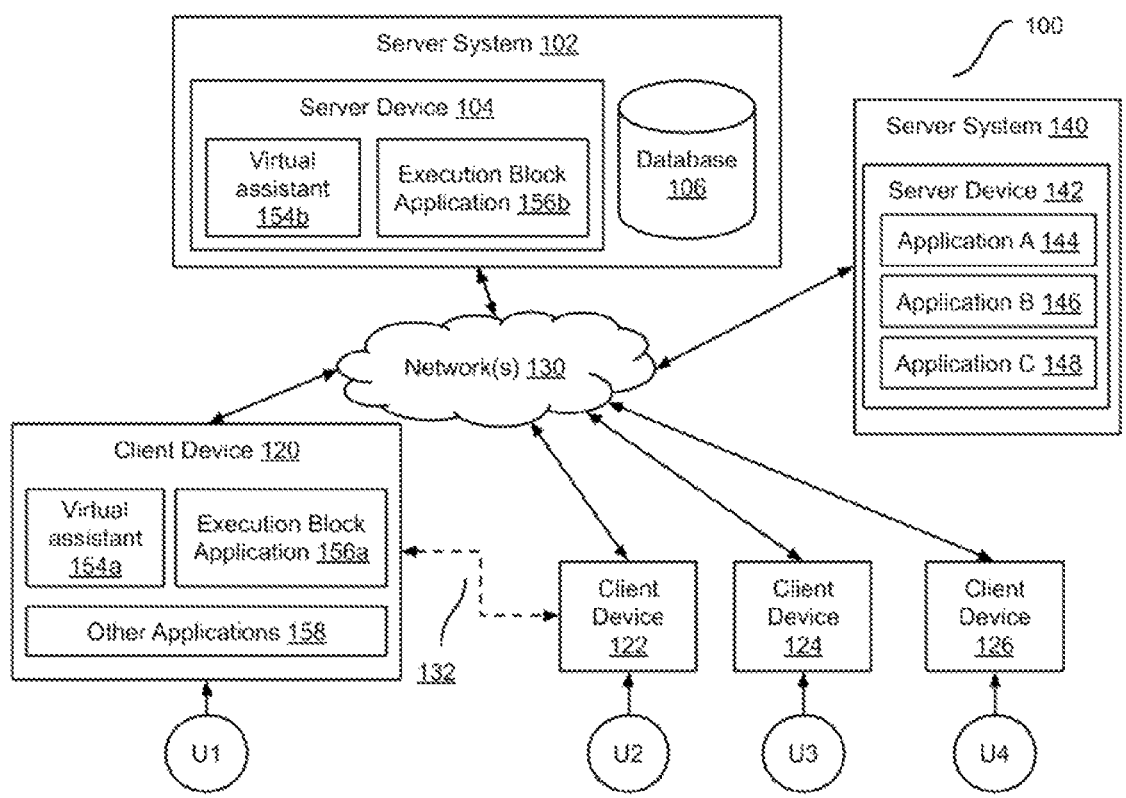
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 and second server system 140 in the example of FIG. 1. Server systems 102 and 140 can communicate with a network 130, for example. Server system 102 can include a server device 104 and a database 106 or other storage device. In some implementations, server device 104 may provide virtual assistant application 154*b* and/or execution block application 156*b*. Second server system 140 can include a second server device 142, configured to provide one or more applications, e.g., application A 144, application B 146, and application C 148. In FIG. 1 and the remaining figures, a letter after a reference number, e.g., "156*a*," represents a reference to the element having that particular reference number. A reference number in the text without a following letter, e.g., "156," represents a general reference to embodiments of the element bearing that reference number.

Network environment 100 also can include one or more client devices, e.g., client devices 120, 122, 124, and 126, which may communicate with each other and/or with server system 102 and/or second server system 140 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, second server system 140, and second server device 142, and shows four blocks for client devices 120, 122, 124, and 126. Server blocks 102, 104, 106, 140, and 142 may represent multiple systems, server devices, and network databases, and the blocks can be provided in different configurations than shown. For example, server system 102 and/or second server system 140 can represent multiple server systems that can communicate with other server systems via the network 130. In some implementations, server system 102 and/or second server system 140 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 or second server system 140, and/or via a network service, e.g., a social network service or other type of network service, implemented on server system 102 or second server system 140. For example, respective client devices 120, 122, 124, and 126 may communicate data to and from one or more server systems (e.g., system 102, second server system 140).

In some implementations, the server system 102 and/or second server system 140 may provide appropriate data to the client devices such that each client device can receive communicated content or shared content uploaded to the server system 102 or second server system 140 and/or network service. In some examples, users U1-U4 can interact via audio or video conferencing, audio, video, or text chat, or other communication modes or applications.

A network service implemented by server system 102 or second server system 140 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide a virtual assistant application 154a, an execution block application 156a, and one or more other applications 158. Client devices 122-126 may also provide similar applications. Virtual assistant application 154a, execution block application 156a, and other applications 158 may be implemented using hardware and/or software of client device 120. In different implementations, virtual assistant application 154a and execution block application 156a may each be a standalone client application, e.g., executed on any of client devices 120-124, or may work in conjunction with virtual application 154b and execution block application 156b provided on server system 102.

Virtual assistant application 154 may provide various functions. For example, such functions may include one or more of providing an assistive user interface, interacting with a user via a conversational user interface, responding to user queries, performing one or more operations in response to a user request, running an execution block, etc. Virtual assistant application 154 may invoke execution block application 156 and/or any other application, e.g., any application from other applications 158 automatically, or upon a user request.

Execution block application 156 may provide various functions. In some implementations, execution block application may generate execution blocks based on user interaction data. In different implementations, execution blocks may be stored, e.g., in database 106. In some implementations, execution block application 156 may analyze user interaction data to generate execution blocks. In some implementations, execution block application 156 may generate semantic annotations for one or more execution blocks. In some implementations, execution block application 156 may edit or customize execution blocks, e.g., based on the version of one or more other applications 158, based on an operating system of a client device 120 and/or a server device 104, etc. In some implementations, execution block application 156 may provide access to a repository of execution blocks.

In some implementations, client device 120 may include one or more other applications 158. For example, other applications 158 may be applications that provide various types of functionality, e.g., calendar, address book, email, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of other applications 158 may be standalone applications that execute on client device 120. In some implementations, one or more of other applications 158 may access a server system, e.g., server system 102 and/or second server system 140, that provides data and/or functionality of other applications 158. For example, any of applications 144, 146, and 148, shown as being provided by second server system 140 may provide data and/or commands to one or more of other applications 158. In some implementations, server applications 144-148 may be standalone applications that are accessed by a client device, e.g., via a web-browser, or other client-side program.

A user interface, e.g., provided by virtual assistant application 154, execution block application 156, or other applications 158, and displayed on a client device 120, 122, 124, and/or 126 as a visual user interface on a screen can include user content and other content, including images, video, data, and other content as well as communications, privacy settings, notifications, and other data. Such a user interface can be displayed using software on the client device, software on the server device, and/or a combination of client software and server software executing on server device 104 and/or second server device 142, e.g., application software or client software in communication with server system 102 and/or second server device 142. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device. In some implementations, the user interface may include an audio user interface, in addition to or as an alternative to a visual user interface Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2A:
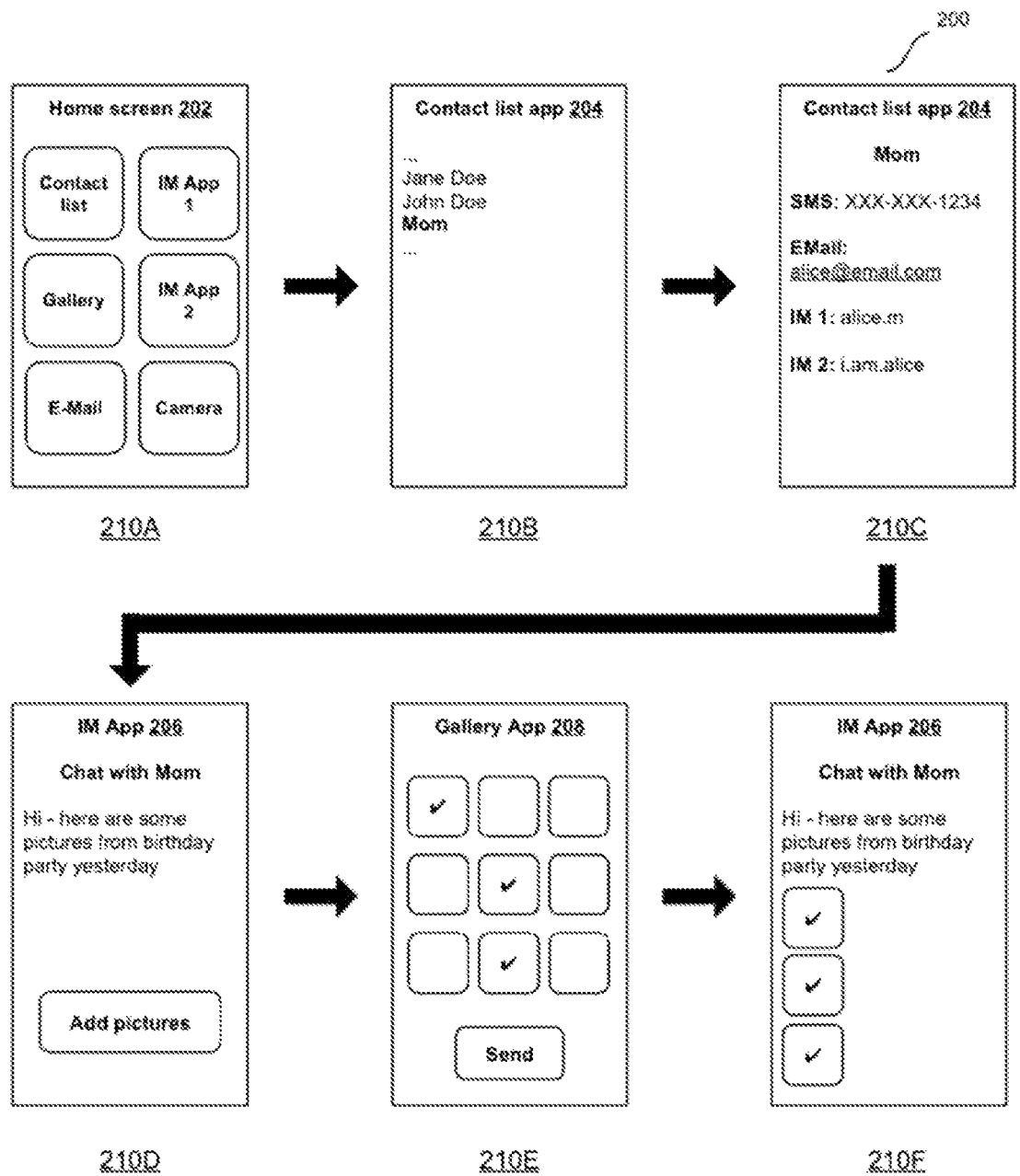
FIG. 2A illustrates an example user journey to send pictures to another user using a computing device.

FIG. 2A illustrates an example user journey 200 to send pictures to another user using a computing device. User interface states 210A-210F illustrate the user journey. As illustrated in FIG. 2A, a home screen (202) of a computing device of the user includes a plurality of application icons, e.g., for various applications (apps) such as "Contact list," "Gallery," "E-mail," "IM App 1," "IM App 2," and "Camera."

The contact list app may enable a user of the computing device to access a list of contacts including contact names, phone numbers, email ids, instant messaging identifiers, etc. The gallery app may enable the user to view, edit, or share images, e.g., photos and/or videos. The email app may enable the user to send and receive email via the computing device. IM app 1 and IM app 2 may respectively enable the user to participate in instant messaging conversations via different instant messaging (IM) service providers. The camera app may enable the user to capture a picture or video via a camera of the computing device.

The user may access application functionality of these and other applications of the computing device by launching the application, e.g., by selecting the app icon by touch, gesture, or click; by a voice command; etc. Further, the applications may provide application programming interfaces (APIs) that can be utilized to programmatically access application functionality. For example, an application API of the IM app may be utilized by the gallery app to automatically launch the IM app in a particular state.

The user of the computing device may utilize the computing device to perform one or more computer-mediated tasks using the applications. Each task may include a plurality of operations, together comprising a user journey to accomplish the computer-mediated task. For example, FIG. 2A illustrates an example user journey for the user to accomplish the task of sending pictures to another user ("Mom") using the computing device.

As illustrated in FIG. 2A (210A), the user journey begins when the user selects the contact list app icon on the home screen (202). In response to the user selection, the contact list app (204) is launched. The contact list app (shown in 210B) displays a list of the user's contacts, e.g., "Jane Doe," "John Doe," "Mom," etc. The contact list app enables the user to select a particular contact, e.g., "Mom." In response to the user selecting the particular contact, the user interface is updated to show details of the contact (210C), e.g., an phone numbers that can receive messages via short message service (SMS number), an email address, and instant messaging addresses, of Mom.

The user journey further includes the user selecting a particular detail associated with the contact "Mom" in the contact list app (204), e.g., an instant messaging service identified of the contact ("alice.m") on instant messaging service IM1. In response to the user selection, the corresponding instant messaging app (e.g., "IM1") is launched and the user interface of the IM app (206) is displayed on the computing device (210D). As shown, the user interface enables the user to enter a message ("Hi—here are some pictures . . . ") and includes a selectable option ("Add pictures").

The user journey further includes the user selecting the option. In response to the selection, the gallery app (208) is launched and the user interface of the gallery app is displayed (210E). The user interface shows a plurality of pictures (shown as blank rectangles) and enables the user to select pictures (shown with checkmarks) to be sent to Mom via the IM App (206). Upon the user completing the selection and choosing the "Send" button, the pictures are sent to Mom via the IM App and the user interface is updated accordingly (210F).

Figure 2B:
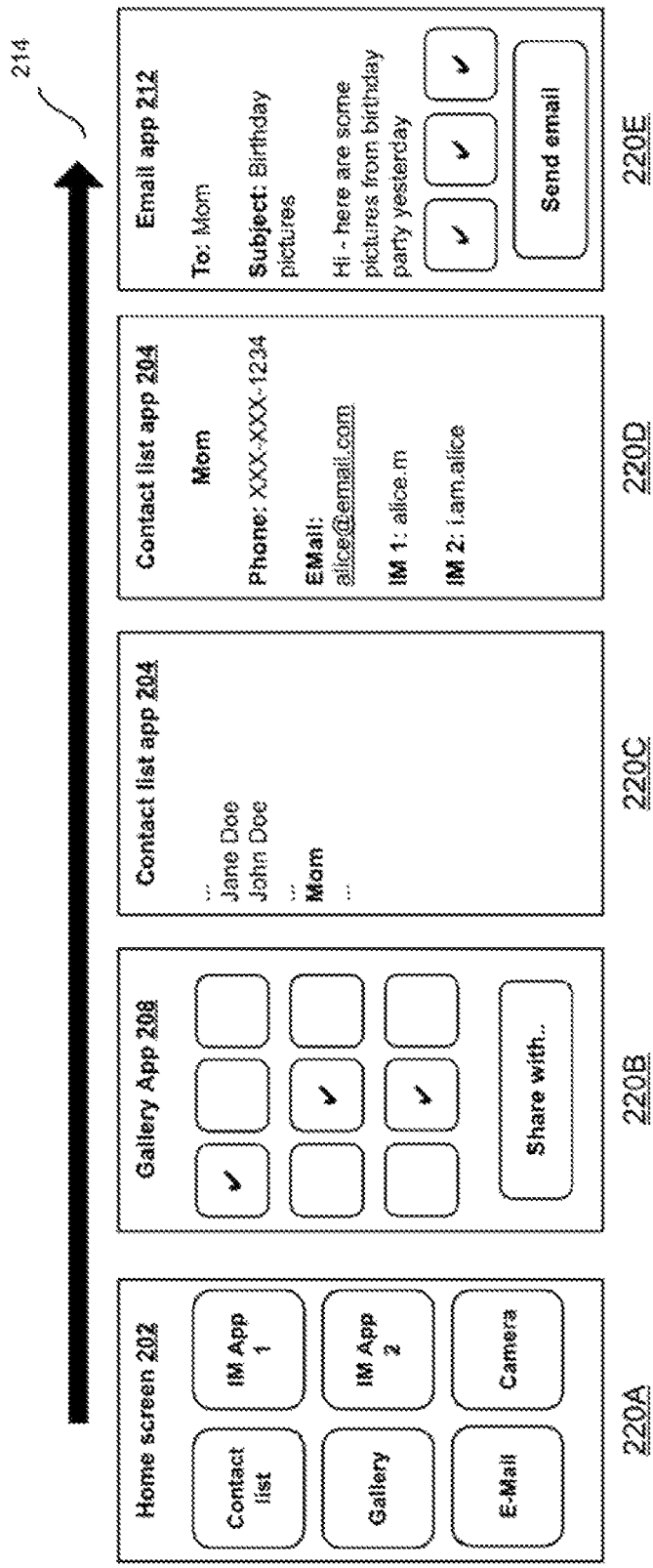
FIG. 2B illustrates another example user journey to send pictures to another user using a computing device.

In many computing devices, alternate user journeys can accomplish the same task. FIG. 2B illustrates another example user journey 214 to send pictures to another user using a computing device.

As illustrated in FIG. 2B, the alternative user journey begins by the user selecting the gallery app (208) from the home screen (220A). In response, the user interface of the gallery app (208) is displayed (220B) on the computing device. The user interface enables the user to select pictures and choose the button "share with . . . " When the user selects pictures and presses the button, the contact list app (204) is displayed. The user scrolls the contact list and selects the user Mom. In response to the selection, contact details are displayed (220D). The user then selects the email option. In response, the email app (212) is launched, e.g., in email compose mode, with the selected pictures included as attachments and the To: field filled with the email address associated with the contact "Mom." The user can then type the email message (e.g., add subject line "Birthday pictures" and body content) and send an email that includes the pictures by selecting the button "send email."

Figure 2C:
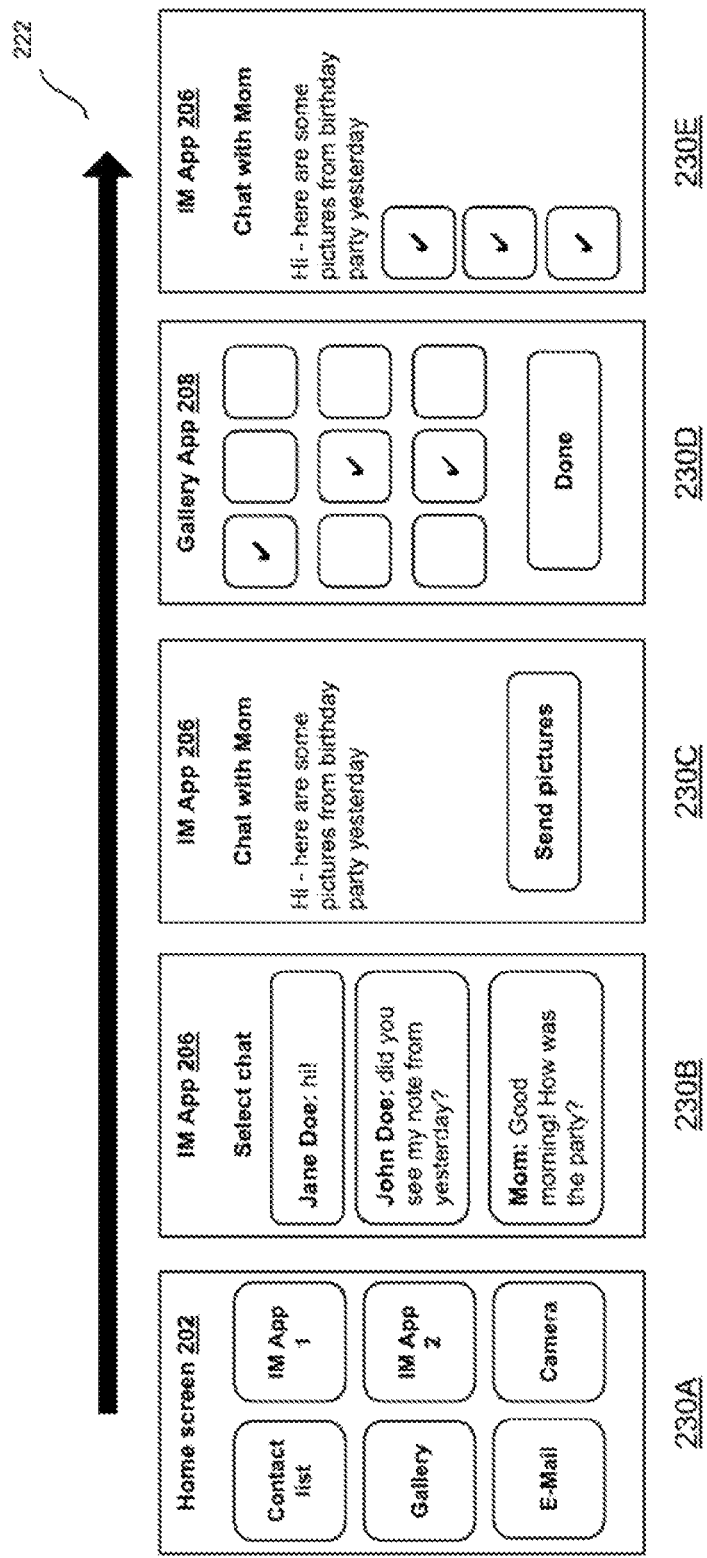
FIG. 2C illustrates another example user journey to send pictures to another user using a computing device.

FIG. 2C illustrates another example user journey 222 to send pictures to another user using a computing device. As illustrated in FIG. 2C, the alternative user journey begins by the user selecting the IM app (206) from the home screen (230A). In response, the user interface of the IM app (206)

is displayed (230B) on the computing device. The user interface enables the user to select a particular chat conversation from a list of chat conversations (e.g., between the user and other users Jane Doe, John Doe, and Mom). When the user selects the conversation with Mom, details of the chat conversation are displayed (230C). The user then types a message ("Hi—here are some pictures . . . ") and chooses the button "send pictures." In response to the selection, the gallery app (208) user interface is displayed (230D). The user selects pictures and selects the "Done" button. In response, the pictures are sent via the IM app (230E).

In the user journey illustrated in FIG. 2A, to accomplish the task "share pictures with Mom," the user is required to perform multiple operations—selecting the contact list app, scrolling the contact list and selecting Mom, selecting the IM app, selecting the add pictures option in the IM App, and selecting pictures and choosing send. Further, the operations that are performed span several applications—home screen, contact list app, IM app, and gallery app.

In the user journey illustrated in FIG. 2B, to accomplish the task "share pictures with Mom," the user is required to perform multiple operations—selecting the gallery app, selecting pictures (which may include scrolling), selecting the contact's email address from the contact list (which may also include scrolling), and selecting the "send email" option after composing the message. The operations that are performed span several applications—home screen, gallery app, contact list app, and email app.

In the user journey illustrated in FIG. 2C, to accomplish the task "share pictures with Mom," the user is required to perform multiple operations—selecting the IM app, selecting a particular chat conversation, selecting the "send pictures" button, selecting pictures via the gallery app (which may include scrolling), and selecting the "done" button. The operations that are performed span several applications—home screen, IM app, and gallery app.

In each of these user journeys, the user utilizes multiple applications and corresponding user interfaces to accomplish the task. In performing different tasks, even within a single application, the user needs to perform a number of operations to accomplish the task.

The performance of a computing task that requires the manipulation of multiple software applications can be a source of user dissatisfaction. For example, each application used in the user journeys illustrated in FIGS. 2A-2C may have a different design language, and may offer different and possibly incompatible ways of performing the same action. When a user switches between these different applications sequentially to perform the task, they may feel a sense of disorientation or cognitive burden as they do so. This may be true even if the two applications are individually well-designed.

Further, the difficulty can be higher when the applications run on different devices; for example, when the completion of a task requires the manipulation of an application on a smart-watch, and simultaneously an application on a car entertainment system. There are many tasks where such "application-switching" is the only way of getting the task done, and without continuity in the user experience, performing these tasks can place a significant cognitive burden on the user.

When a user uses UI to accomplish a task, a certain amount of cognitive function that is involved in the process. For example, in each of the user journeys illustrated in FIGS. 2A-2C, the user is required to view a screen and understand the placement of different pieces of information. The user has to read and comprehend the information presented on the screen, and make a decision about the next course of action. The user also has to perform a series of actions, navigating through a set of screens, in a planned sequence. Such navigation can involve a process of discovery through trial and error, as the user tries to find a feature they may have not used previously. At each step, the user may have to provide inputs to the computing device, in the form of text (e.g., search input to search apps, contacts, pictures, etc.; message content for IM or email message); audio (e.g., to invoke an app using voice; to select images using voice; etc.); gesture or touch (e.g., mouse movement and clicking, or touchscreen input to select pictures, select buttons and other UI elements); etc.

Through the user journey, the user also needs to retain certain elements of their intention and actions in short-term memory. The composite of all these cognitive functions requires the user to pay a certain amount of attention to the UI, and exercise executive function to control their behavior in the process of using the UI to perform the task.

The use of a computing device to accomplish a task thus requires the user to exercise memory, reasoning, problem-solving, prior knowledge, attention, comprehension, executive function, and so on. Depending on the inherent complexity of the task and the available applications to perform the task, such user interaction may be overly demanding of the user, leading to one or more failures prior to successfully accomplishing the task. This can lead to a feeling of resentment and frustration.

Further, user interfaces can contain inherent developer assumptions, which can make UIs inaccessible to certain groups of users. For example, such assumptions may be around language competence, making a UI that's easy to use by a native speaker of English (for example) very hard to use by a person who is an English language learner. Other assumptions may break when the UI is used by a person with limited cognitive ability.

Further, if the user uses a variety of devices, each with its own input and output capabilities and modalities, these assumptions can also make user interfaces hard to use in a consistent way across different device classes. For example, while a device with a screen can include a UI that presents a large number of options as icons, which enables the user to quickly scan and select particular options, presenting the same set of options via a voice interface can be overwhelming for the user, since the user needs to exercise short term memory to remember the options. The user may also not have the patience to wait for the voice interface to present all of the options. Further, when the options have to be presented to the user in an environment such as an automobile or while working in the kitchen, the process of scanning and choosing an option may require a level of attention and concentration that the user is unable to muster. User interfaces do not always translate easily between different types of devices, and require expensive revisions to make the functionality accessible on multiple platforms.

At least some of the implementations described herein provide techniques to address these problems. The techniques provide an assistive user interface with execution blocks that expose application functionality in a consistent, user-friendly manner to help a user accomplish tasks.

Figure 3:
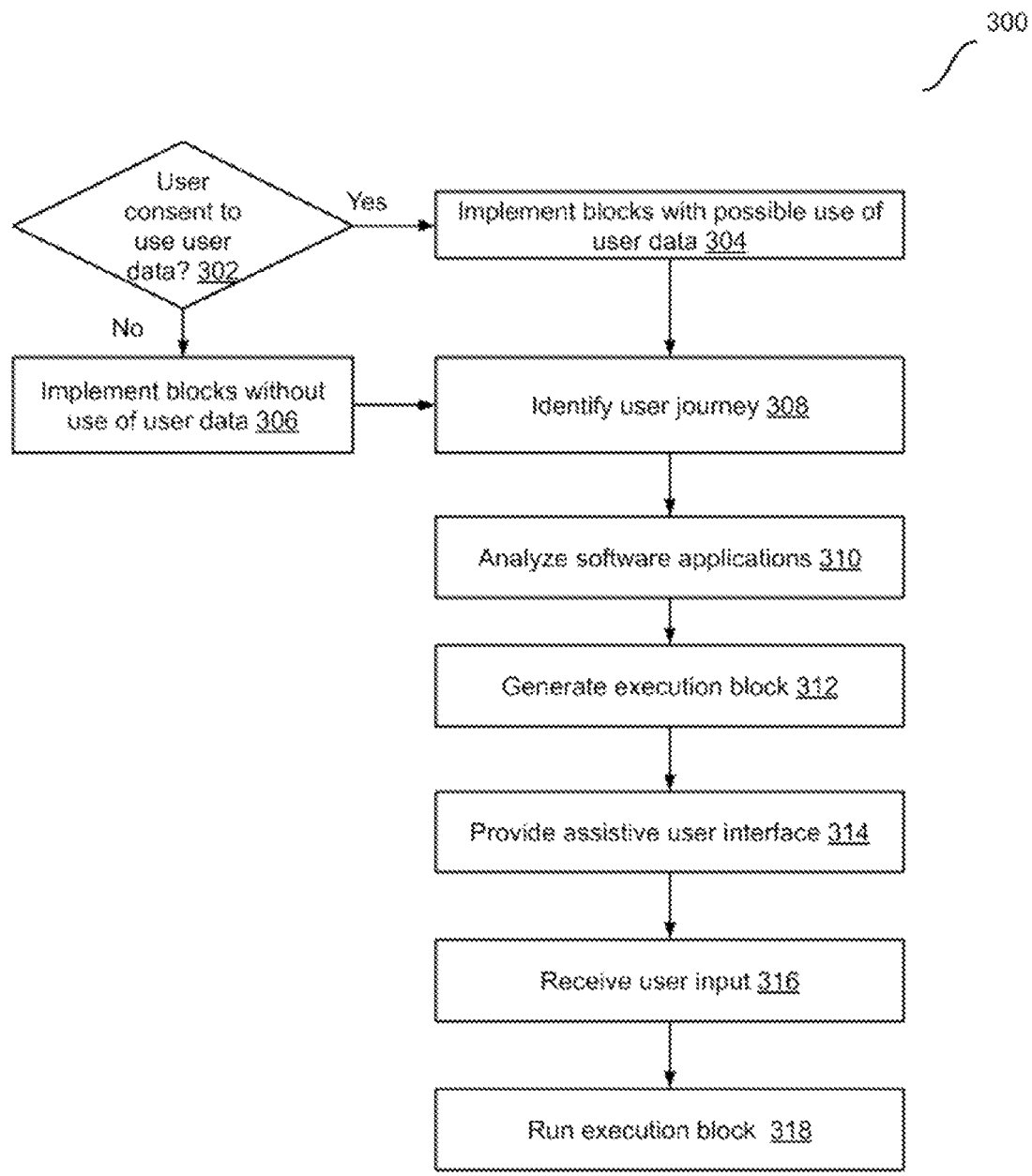
FIG. 3 is a block diagram illustrating an example method to provide an assistive user interface, according to some implementations.

FIG. 3 is a flow diagram illustrating an example method 300 to provide an assistive user interface, according to some implementations. In some implementations, method 300 can be implemented, for example, on a server system 102 as shown in FIG. 1. In some implementations, some or all of the method 300 can be implemented on one or more client devices 120, 122, 124, or 126 as shown in FIG. 1, one or more server devices, and/or on both server device(s) and client device(s).

In the described examples, the implementing system includes one or more digital processors or processing circuitry ("processors"), and one or more storage devices (e.g., a database 106 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

Method 300 may begin at block 302. At block 302, it is checked whether user consent (e.g., user permission) has been obtained to use user data in the implementation of method 300. For example, user data can include user interaction data, e.g., a clickstream, user's schedule, user data related to the use of a messaging application, user preferences, user biometric information, user characteristics (e.g., identity, name, age, gender, profession, user's cognitive and/or motor capabilities, etc.), information about a user's social network and contacts, social and other types of actions and activities, content, ratings, and opinions created or submitted by a user, a user's current location, historical user data such as usage patterns associated with software applications on a user computing device, images generated, received, and/or accessed by a user, images viewed or shared by a user, etc. One or more blocks of the methods described herein may use such user data in some implementations.

If user consent has been obtained from the relevant users for which user data may be used in the method 300, then in block 304, it is determined that the blocks of the methods herein can be implemented with possible use of user data as described for those blocks, and the method continues to block 308. If user consent has not been obtained, it is determined in block 306 that blocks are to be implemented without the use of user data, and the method continues to block 308. In some implementations, if user consent has not been obtained, blocks are implemented without the use of user data and with synthetic data and/or generic or publicly-accessible and publicly-usable data. In some implementations, if user consent has not been obtained, method 300 is not performed.

At block 308, a user journey is identified. Identification of a user journey may include identifying a plurality of operations to perform a computer-mediated task. With user permission, user interaction data may be obtained to identify the user journey. In different implementations, user interaction data may include a sequence of actions performed to complete the computer-mediated task. For example, the user interaction data may include a clickstream, e.g., a set of user-performed actions such as tapping at a particular location (e.g., corresponding to a user interface element such as an icon, a button, etc.) on a touchscreen device; clicking on the particular location, e.g., using a mouse or touchpad; providing keystroke input via a keyboard or other device; performing gestures; or other input operations.

In some implementations, the user interaction data may include one or more voice commands, e.g., provided to a virtual assistant. In some implementations, the user interaction data may include a chat sequence, e.g., a chat between a user and a virtual assistant, with user-entered text corresponding to various events, e.g., commands or requests provided to the virtual assistant.

In some implementations, user interaction data may include an event log, e.g., stored by an application and/or a device operating system of a user device. For example, the event log may include a sequence of events determined based on user interaction with the application, e.g., selection of a menu option, scrolling, clicking a button, etc. In another example, the event log may include a sequence of events determined based on automated test suites, e.g., automatically performed operations that are used to test a software application.

In some implementations, the plurality of events in the user interaction data, e.g., obtained as a clickstream, via an event log, or from a test suite, may be classified into one or more event clusters using clustering techniques, e.g., machine-learning based or other clustering techniques. For example, event clusters may include a "start event" (associated with a start of the computer-mediated task) and an "end event" (associated with a start of the computer-mediated task) for each user journey. For example, in the user journey to book a cab, the start event may be the launching of a cab-booking application or website. Continuing with the cab example, other event clusters may include clusters associated with events in the interaction data that correspond to specifying a start address and an end address, confirming a price for the journey, specifying a type of cab, specifying a payment mode, authorizing a payment, etc. The end event may be identified as authorization of the payment or provision of feedback for the cab ride.

In some implementations, the user interaction events may be associated with different applications. For example, in the cab example, a first application be the cab-booking application, with the events of entering addresses, selecting a type of cab, specifying a payment mode, and confirming the price being associated with the cab-booking application, and a second application may be an electronic wallet application, with the event of authorizing the payment being associated with the electronic wallet application.

The identified user journey may include a sequence of operations to perform a computer-mediated task. Each operation in the sequence may be annotated to indicate a position of the operation in the sequence. Operations in the sequence may also be annotated to include other information, e.g., a software application used to perform the operation, a displayed UI that corresponds to the operation and a user selection of a particular user interface element of the displayed UI, information provided to complete the operation, etc. Further, if an event log is utilized to identify the user journey, events triggered by an operation, e.g., updates to a file system, commands sent to a browser, etc. can also be stored as annotations of the operation. Block 308 may be followed by block 310.

At block 310, a plurality of software applications (e.g., one application, two applications, or more applications) are analyzed to identify a plurality of executable units of the software applications. In some implementations, analyzing the software applications may include analyzing application programming interface (API) definitions of a plurality of software applications. In some implementations, analyzing the software applications may include analyzing user interface (UI) elements of the plurality of software applications.

In some implementations, analyzing an API definition may include obtaining semantic annotations associated with the API definition. For example, the semantic annotations may include an API name, e.g. "GetAddress," "GetPhotos," etc. The semantic annotations may also include the API specification, e.g., provided by the developer of the software application. The API specification may indicate, e.g., how the API is to be called and associated input parameters, and/or what the API returns, e.g., output parameters. Analysis of the API definition may also include accessing functionalities of the software application that are registered with a device operating system of a device on which the application can execute, e.g., such that the operating system (OS) or other applications can access the functionality by calling the API.

Based on the semantic annotations (e.g., API names, API specification, functionalities registered with the device OS, etc.), the API associated with the API definition may be mapped to a particular executable unit. For example, based on the API name "GetAddress," the API may be mapped to an executable unit that, when run on a processor, obtains an address, e.g., via GPS or other on-device sensor, via user input, etc. Different APIs may get mapped to different executable units. Further, a single API may get mapped to different executable units, e.g., when the parameters associated with the API can be used to specify different functionalities of the API. The parameters associated with the API may also be utilized to identify one or more parameters for the particular executable unit.

In some implementations, analyzing user interface (UI) elements of the software applications may include mapping each UI element to a particular executable unit. For example, image analysis and recognition techniques and/or optical character recognition (OCR) techniques can be utilized to recognize that a UI button in a software application is labeled "Send" (text on the UI element) or has corresponding graphical content, e.g., an icon such a "paper airplane icon." Based on the recognition, the UI element may be matched to a particular executable unit that offers corresponding functionality, e.g., "Send" functionality, within the application context. For example, if the software application is an electronic wallet, the "Send" button may be matched to a "Send money" executable unit while if the software application is an instant messaging application, the "Send" button may be matched to a "Send message" executable unit. Further, the particular executable unit may be configured with one or more parameters based on the UI. For example, if the "Send money" UI element is placed next to a text box that takes a currency value as input, the particular executable unit may be set up with a parameter of "currency" that is to be obtained for execution of the particular executable unit.

Further, other UI elements that occur on a user interface as the particular UI element may be used to determine the context which can then be used to identify the particular executable unit that the UT element is mapped to. For example, a UI element that includes an up arrow, e.g., "i" that is placed in a UT that includes a "file transfer" menu may provide the context that the UT element corresponds to "upload." Further, shape, size, or placement of the UT element can also be used to map the UT element to a particular executable unit.

In some implementations, the UT elements may include audio UT elements, e.g., that are spoken aloud to the user. In these implementations, analyzing the audio UT elements may include utilizing speech recognition techniques to detect a tone of the audio UT element or a text of the audio UT element. Based on the detected tone and/or text, the audio UT element may be matched to the particular executable unit. For example, an audio UT element that prompts the user with "which song do you want to play?" may be associated with a music playback executable unit, e.g., with a parameter "Song identifier" that is to be obtained for execution of the music playback executable unit. In some implementations, the tone and/or text may be analyzed to determine the input for the audio UT element. For example, the text "which song do you want to play?" may be determined as requiring a parameter "song identifier" as the input. Block 310 may be followed by block 312.

At block 312, an execution block is generated based on the user journey as identified in block 308 and the plurality of executable units identified in block 310. In some implementations, the execution block may define a sequence of two or more of the plurality of executable units that when executed complete the computer-mediated task of a particular user journey. In some implementations, generating the execution block may include mapping each of the plurality of operations of the user journey to particular executable units of the plurality of executable units.

For example, the user journey illustrated in FIGS. 2A-2C may be mapped to a plurality of executable units associated, each performing a respective operation, such as "identify contact address and modality" (e.g., alice.m on IM1), "select photos" (e.g., from a user's photo library), and "Send via TM" (e.g., via IM1) executable blocks. The executable units may be determined as described above with reference to block 310. Further, the execution block may combine the executable units in a sequence such that the respective software applications from which the executable units are obtained can be invoked during execution of the execution block.

For example, running an execution unit may include invoking the corresponding software application by performing an API call to the software application using the corresponding API definitions, or automatically navigating the user interface of the software application. For example, the execution block may be provided via a virtual assistant on a computing device and the virtual assistant application may invoke respective software applications as defined in the sequence of executable units of the execution block. In some implementations, the software applications may be invoked via an API such that no user interface is displayed while running an executable unit. In some implementations, the software applications may be invoked silently, such that the user interface of the software applications is not displayed to the user, and is instead, automatically navigated, as specified in an executable unit.

In some implementations, automatically navigating the user interface provided by the respective software applications may include the virtual assistant recognizing the user interface provided by the respective software applications and based on the recognizing, automatically providing a click input, a touch input, a voice input, or a keyboard input to the respective software application. In some implementations, automatic navigation may include the virtual assistant automatically triggering an event associated with a button click, a menu selection, scrolling, or other operations with reference to the user interface provided by the respective software applications.

The recognizing may include matching the user interface with user interface information that is stored as part of the executable unit (e.g., recognizing the "Send" button). In some implementations, the matching may be performed by utilizing computer vision techniques. Block 312 may be followed by block 314.

At block 314, the execution block may be provided for selection by a user. In some implementations, an assistive user interface that includes the execution block along with other execution blocks, each associated with a respective computer-mediated task may be provided. For example, the assistive user interface may be provided via a virtual assistant. In some implementations, the assistive user interface may be a visual display, e.g., that includes a plurality of icons, each corresponding to a particular execution block. In some implementations, the assistive user interface may be provided as an audio UI, e.g., via audio or visual prompts such as "Say send photos to X," "Say view my beach photos," etc. The user can activate a particular execution block by selecting from the visual display, by providing a spoken command, etc.

In some implementations, the assistive user interface may be displayed on a computing device, e.g., a client computing device. In some implementations, the assistive user interface may be provided based on the use context of the computing device. For example, if a large number of execution blocks are available, a subset of the execution blocks that are suitable for the context (e.g., likely to be used by the user) may be identified and provided via the assistive user interface. In some implementations, the use context of the computing device may be determined, with user permission, based on system state of the computing device and/or patterns of use associated with the computing device. In these implementations, execution blocks may be selected for the assistive user interface by determining whether the computer-mediated task associated with an execution block matches the use context of the computing device.

For example, the system state may include system parameters such as current time, current location, whether the computing device was recently used for a particular action such as capturing photos, etc. For example, if the current location is different from home, an execution block that is associated with the task "book a cab home" may be displayed, while if the current location is home, execution blocks such as "turn on the lights" may be displayed. In another example, if the computing device was recently used to capture photos, execution blocks such as "auto-enhance recent photos," "share photos with Mom," etc. may be displayed. In another example, if the system state of the computing device indicates a low battery status, an execution block "conserve power" may be displayed. For example, the execution block "conserve power" may include executable units that perform actions such as turning on a low power mode of the device, reducing screen brightness, putting power-hungry apps to sleep, etc.

With user permission, patterns of use associated with the computing device may be identified and utilized to select execution blocks to display in the assistive user interface. For example, if the user permits, data such as times when certain execution blocks are typically utilized, user's calendar information, usage data associated with various software applications, etc. may be utilized to determine patterns of use of the computing device. For example, if the user has a pattern of using the computing device to play podcasts when driving to work, an execution block such as "play latest podcast" may be displayed when it is determined from location data of the computing device or from calendar information that the user is likely on the way to work. In another example, if the user's calendar indicates a daily routine, e.g., workout appointment, corresponding execution blocks such as "play workout music" may be displayed.

In some implementations, the assistive user interface may be customized based on user preferences or other user-specific factors. For example, users with limited physical capability to perform accurate touch gestures, e.g., having essential tremor, suffering from Parkinson's disease, etc. may be provided with a UI that includes large or sticky icons or are otherwise customized to receive input from such users, or via audio. In another example, users with limited cognitive capabilities, e.g., users who don't read the language of the UI, users that have difficulty perceiving certain colors or shapes, users with memory impairments, etc. are provided with suitable assistive user interfaces, that take into account the user's capabilities, e.g., display graphical icons, provide navigational cues and memory aids, etc. For example, the assistive user interface may be a conversational user interface in which the virtual assistant obtains user input regarding execution block parameters in a turn-by-turn manner.

In some implementations, the user or another user, such as a parent or caregiver, may provide information regarding execution blocks, that may be utilized in selecting the execution blocks to be provided via the assistive user interface. For example, a parent may specify that execution blocks such as "Call Mom," or "Tell me stories," be provided via the assistive user interface in particular contexts, e.g., when a child reaches home from school, at bedtime, etc. The information may include contextual factors associated with an execution block, the device on which the execution block is provided, a configuration of the assistive user interface such as color scheme, layout, icon size, speech language, etc.

In some implementations, the assistive user interface may be provided based on contextual factors, obtained with user permission. The assistive user interface may be presented differently on different computing devices. For example, on a device with a touchscreen display, such as a smartphone, tablet, or smart display, the assistive user interface may be presented as a grid of icons, while on a smart speaker that lacks a display, the assistive user interface may be presented via an audio prompt, e.g., "welcome home, would you like to turn on the lights?" to provide the user with easy access to the execution block "Turn on home lights." Such customization of presenting the assistive user interface can make execution blocks accessible on devices and in use-cases where selection from a long list is difficult, e.g. voice input devices, users with cognitive impairments, etc. Block 314 may be followed by block 316.

At block 316, user input may be received that is indicative of activation of a particular execution block from the assistive user interface. In some implementations, if the execution block is configured to accept user input for one or more parameters, further user interfaces may be provided that enable the user to specify one or more parameters.

For example, providing the further user interfaces may include providing a prompt to the user to request a parameter for the particular executable unit of the sequence (e.g., specify a contact to whom photos are to be sent, specify a from address for a cab booking, etc.). A user response may be received that includes the parameter and may be utilized during the running of the execution block. In some implementations, the virtual assistant that provides the assistive user interface may also present the further user interfaces, thus providing the user a consistent user interaction experience, even if the particular execution block includes executable units that utilize different software applications. In response to the user input, the execution block may be run to complete the computer-mediated tasks. Block 316 may be followed by block 318.

At block 318, the execution block is run. For example, the sequence of executable units of the execution block may be run. If the user has provided input for one or more parameters, the execution block is run with the user-specified parameters. For example, if the user has selected an execution block "share photos with Mom," the sequence of executable units may include a first unit to identify an address and modality to use, a second unit to select photos, and a third unit to activate the selected modality and send the photos.

For example, the address and modality may be determined by running the first unit to identify an IM address for Mom via IM 1. Further, with user permission, the selection of photos may be performed automatically by the second unit, e.g., photos that were not previously shared with Mom, such as recently captured photos. Alternatively, or in addition, the selection of photos may be performed based on user input parameters, e.g., "Birthday photos," "Photos from yesterday," etc. The selected modality/address and photos may be provided to the third unit, which may send the photos via IM 1.

In some implementations, an execution block may be stored at different levels of abstraction or hierarchy. For example, when the execution block is generated based on user interaction data such as selection of specific icons or other user interface elements, or specific positions with the user interface via gestures, touch input, etc., the executable units within the execution block may be represented as inputs to be automatically provided on specific UI views of a software application associated with the executable unit. In this example, running the execution block may include running the software application and automatically providing the icon selections or other user interactions. In different implementations, the UI of the software application may be displayed (allowing the user to view the execution block in action and learn the sequence of actions) or may be hidden from view.

At a higher level of abstraction, the input operations (gestures, touch inputs, etc.) as well as the user interface of the software application (e.g., send button, save button, etc.) may be represented using corresponding semantics. The representations may enable the executable units to be transportable across software application versions and device configurations. For example, the executable unit may specify, at the high level of abstraction, that the action is to select a send button, and the virtual assistant that invokes the execution block may analyze the software UI to identify the send button and automatically perform the selection via a suitable input such as a tap or click action. At this level of interaction, the virtual assistant may map an executable unit defined with reference to one software application to another, similar software application, based simply on the user interfaces of the respective applications.

In some implementations, the semantics associated with an executable unit may be inferred automatically. For example, internal states such as button labels and accessibility annotations of the software application may be used to infer abstractions, e.g., by a machine learning model. In some implementations, the machine learning model may be trained by executing a software application in a simulated environment and using reinforcement learning to map various user interface elements of the application to operations in user journeys.

In some implementations, the method 300, or portions of the method, can be initiated automatically by a system. In some implementations, the implementing system is a first device. For example, the method (or portions thereof) can be periodically performed, or performed based on one or more particular events or conditions, e.g., the user initiating a user journey, the user providing a command, etc.

In some implementations, method 300 may be performed by a server device (e.g., server device 104), a client device (e.g., any of client devices 120-126), or a combination of a server device and a client device. For example, in some implementations, blocks 308-312 may be performed by a server device to generate execution blocks and blocks 314-318 may be performed by a client device to provide an assistive user interface that enables a user to select and run an execution block. In some implementations, method 300 may be performed entirely by a server device, or by a client device.

Assisted use: Execution blocks, as described herein, provide a higher level of abstraction, grouping operations that are associated with a user journey together into a sequence of executable units. This makes the execution blocks amenable to a number of use cases that are impractical or clunky at a finer level of granularity. For example, an execution block may be provided that enables a user unfamiliar with technology, e.g., an elderly patient, to make payments, e.g., to a caregiver. In another example, an execution block may be provided that enables a user unfamiliar with technology, e.g., a child, to perform actions such as call a parent or purchase a product. In some implementations, an interlock may be provided, where one or more of the executable units (e.g., money transfer) are performed upon approval to another trusted user. In these implementations, the trusted person can provide approval at the level of the computer-mediated task associated with the user intent.

Downloadable execution blocks: Execution blocks generated based on user journeys (e.g., from a clickstream, or other user interaction data) may be provided for download, e.g., via an online repository. For example, execution blocks in the repository may be tested in a virtualized environment against different devices and different versions of the applications from which individual executable units are obtained. In some implementations, execution blocks in the repository may be automatically and dynamically modified to ensure they work correctly across different versions and devices. In some implementations, execution blocks in the repository may be curated automatically (or with input from experts) to highlight execution blocks that are associated with popular user journeys or user journeys suitable for particular users, and to ensure that the execution blocks are comprehensible, functional, and non-malicious. The repository may be presented to the user via a searchable or browsable interface.

Assistive user interface via home screen, AAC, or physical buttons: In some implementations, execution blocks for the assistive user interface for a particular user can be selected by the user, or by a caregiver or a support professional of the user. The selected execution blocks may be provided via a "home screen" of a virtual assistant or equivalent. In some implementations, if the user uses an augmentative and alternative communication (AAC) application on their device, selected execution blocks can be provided as AAC buttons. In some implementations, execution blocks can be made available to the user as physical buttons, or auxiliary devices, that are simpler than a computing device such as a smartphone. For example, a single button labeled "Call for Help" may be provided to an elderly user which is configured to trigger an execution block that includes the user journey of sending a pre-populated message via a messaging application to previously configured recipients, e.g., relatives, doctors, emergency care professionals, etc.

Generation of execution blocks based on other execution blocks: In some implementations, execution blocks may be generated based on previously identified executable units and previously generated execution blocks. For example, a machine learning model may be trained based on known execution blocks to automatically identify executable units from various software applications and adding semantic annotations to the identified executable units. For example, if the known execution blocks include execution blocks to send photos, e.g., "Send photos to user X," "Send yesterday's photos," etc. that include executable units that correspond to multiple applications, the machine learning model may be trained to identify component functionality of other applications, e.g., "Send" functionality in a new instant messaging app, even when the application developer doesn't provide explicit annotations regarding such functionality via an API definition. For example, the user interface of the app may be analyzed by the trained machine learning model to map a "paper airplane icon" to a "Send" executable unit (e.g., based on the icon shape, size, or placement, or associated user interaction) that can then be added to execution blocks that include such a unit.

Device-independent or virtualized execution blocks: In some implementations, the assistive user interface may be provided via a different device than a device on which the execution block (or individual executable units) may be run. For example, the assistive UI may be provided via a wearable device (e.g., a smartwatch) and upon selection, the execution block may be run on a different device (e.g., a smartphone or laptop) or a virtual device, e.g., an emulated device provided via a server. For example, the virtual assistant that provides the assistive UI may utilize the emulated device to run the execution block. These implementations allow the assistive UI to presented on simpler and/or cheaper devices, or a device that the user prefers, none of which may have the capability to perform one or more executable units of the execution block. Further, in these implementations, user-specified parameters, e.g., obtained via user interaction, or automatically determined parameters such as location or other sensor data may be obtained from the device where the assistive UI is displayed and may be provided to the emulated device via a network.

Reduction in cognitive load by use of execution blocks: Execution blocks as described herein may help reduce user cognitive load when performing a computer-mediated task. For example, by encapsulating the user journey in an execution block (which can reduce the burden of remembering sequences of operations), allowing prior configuration or automatic, contextual selection of parameters (which can reduce or remove decision-making burden), and/or presenting an assistive user interface customized for the user (which allows users with different cognitive and/or motor capabilities to run the execution block), execution blocks can enable users to perform computer-mediated tasks with lower cognitive load. Thus, short-term, working and transactional memory requirements for a user to use can execution block can be lower than when performing the computer-mediated task via a user journey that requires direct use of one or more software applications.

Provision of execution blocks on different user devices: Execution blocks as described herein can be provided via any user device. Execution blocks may be particularly useful in contexts where users have limited cognitive and/or motor capabilities (e.g., users with disabilities, users that perform a computer-mediated task simultaneous to other activities such as jogging, cooking, driving, etc.), or where the user device from which the computer-mediated task is performed has limited capabilities, e.g., lacks a screen or has a small screen (e.g., a smart speaker, a wearable device, etc.) Further, physical buttons may be provided that enable a user to run an execution block. In some implementations, an association may be established between an execution block and a physical object, and the assistive user interface may include the user presenting the physical object to a camera (or other sensor) to trigger running the execution block.

Figure 4A:
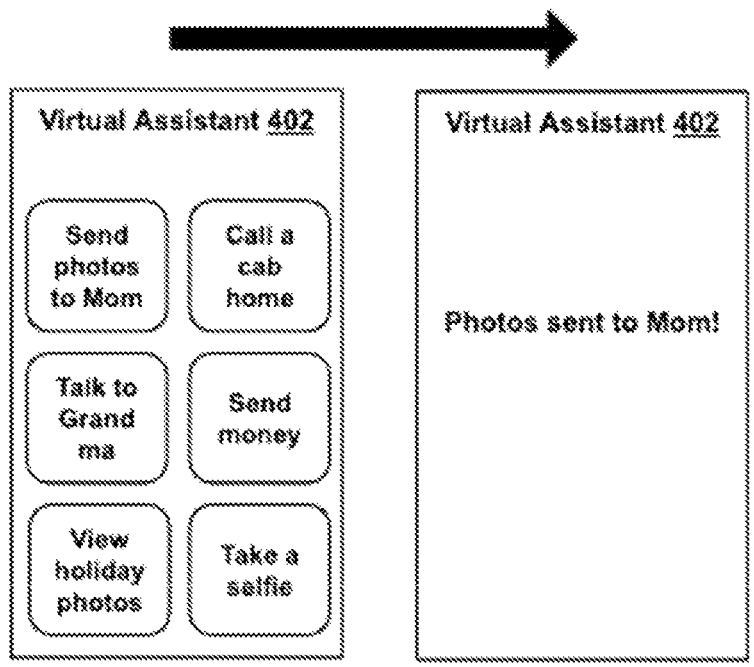
FIGS. 4A-4C each illustrate an example of use of an execution block.

FIG. 4A illustrates an example of use of an execution block. User interface states 410A-410B illustrate the user journey to accomplish the task of "sending photos to Mom" using an execution block. As illustrated in FIG. 4A, a home screen (410A) of a computing device of the user displays a virtual assistant (402) that includes a plurality of execution blocks, each with a corresponding icon.

Each icon corresponds to an execution block that enables the user to perform a corresponding task. For example, the icons in FIG. 4 correspond to execution blocks for the tasks: "send photos to Mom," "Call a cab home," "Talk to Grandma," "Send money," "View holiday photos," and "Take a selfie." In different implementations, the plurality of execution blocks may include any number of execution blocks, e.g., 1 block, 2 blocks, 5 blocks, 10 blocks, 100 blocks, etc.

The user can select a particular icon, e.g., by touch input, by clicking, by a voice command, etc. to run the corresponding execution block. In the example illustrated in FIG. 4A, the user selects "Send photos to Mom." In response to the selection, the execution block is run and photos are sent to the user's contact that is identified as Mom and confirmation is provided to the user (410B). In this example, the user performed a single operation and the task is automatically completed. Intermediate steps of the task, e.g., navigating a gallery and selecting photos, navigating a contact list and choosing a contact to whom the photos are to be sent, and selecting a modality to send the photos (e.g., share via a link or URL, send by email, send by instant messaging, etc.) are automatically completed by the virtual assistant (402) without further user input. Thus, the number of inputs required from the user as well as the cognitive burden to accomplish the task is significantly lower in comparison to the user journeys illustrated in FIG. 2A-2C.

Figure 4B:
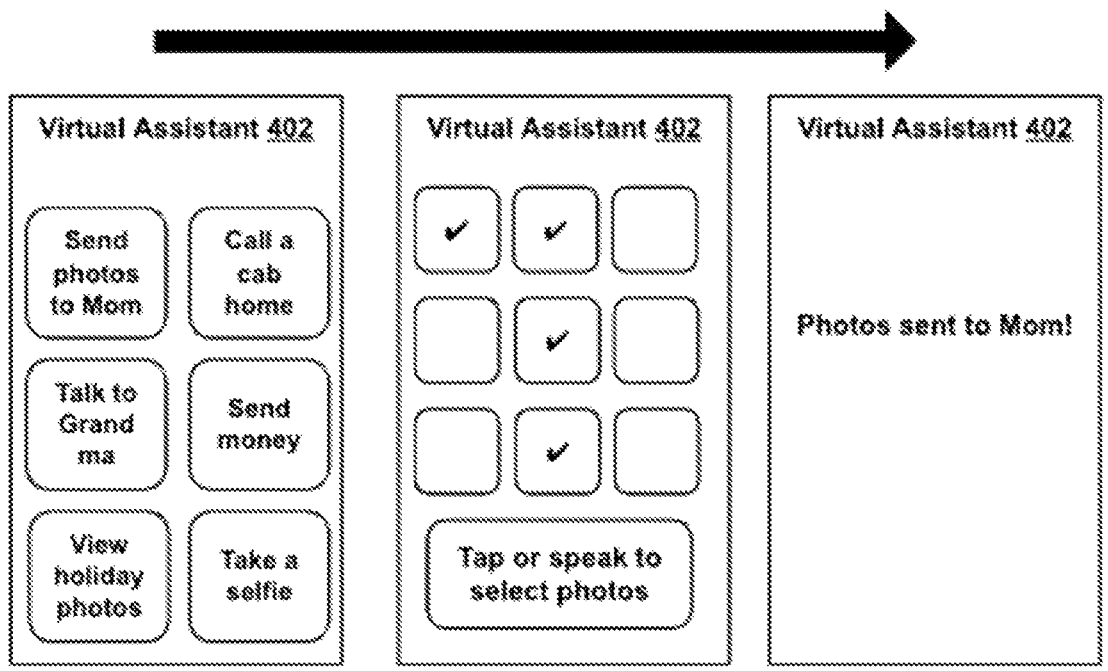

In some implementations, the execution blocks may be parameterized, e.g., configured such that a user that runs the execution block can provide inputs that are used to perform certain steps of the execution block. FIG. 4B illustrates an example of use of an execution block that is parameterized. User interface states 420A-420C illustrate the user journey to accomplish the task of "sending photos to Mom" using the execution block. As illustrated in FIG. 4B, a home screen (420A) of a computing device of the user displays a virtual assistant (402) that includes a plurality of execution blocks, each with a corresponding icon.

The user can select a particular icon, e.g., by touch input, by clicking, by a voice command, etc. to run the corresponding execution block. In the example illustrated in FIG. 4B, the user selects "Send photos to Mom." In response to the selection, the execution block is run. The virtual assistant automatically determines the contact associated with Mom and the modality to send the photos. The photos that are to be sent are a parameter that the execution block is configured to receive via user input. As illustrated in FIG. 4B, s a set of the user's photos (420B) are displayed and a prompt is provided to the user to select photos that are to be sent to Mom ("Tap or speak to select photos").

In some implementations, the execution block may provide an initial selection of photos, e.g., based on user context. For example, if the user sends photos to Mom periodically, photos that have been captured since a previous time that the user sent photos to Mom may be selected automatically. Further, a subset of such photos may be selected, e.g., based on quality criteria, content of the photos, etc. The user can confirm the selections, select additional photos, or deselect one or more of the automatically selected photos. Upon user confirmation, the selected photos are sent to Mom and a confirmation is provided to the user (420C).

In this example, the user performed a single operation to select the execution block and provided additional input, within the virtual assistant application. Intermediate steps of the task, e.g., navigating a contact list and choosing a contact to whom the photos are to be sent, and selecting a modality to send the photos, are automatically completed by the virtual assistant (402) without further user input. The execution block can be defined to have one or more parameters for user input. Further, the user interface presented during running of the execution block is consistent, e.g., uses the same design paradigm, thus reducing the cognitive burden of navigating different UIs of multiple apps. Thus, the number of inputs required from the user as well as the cognitive burden to accomplish the task is significantly lower in comparison to the user journeys illustrated in FIG. 2A-2C.

Figure 4C:
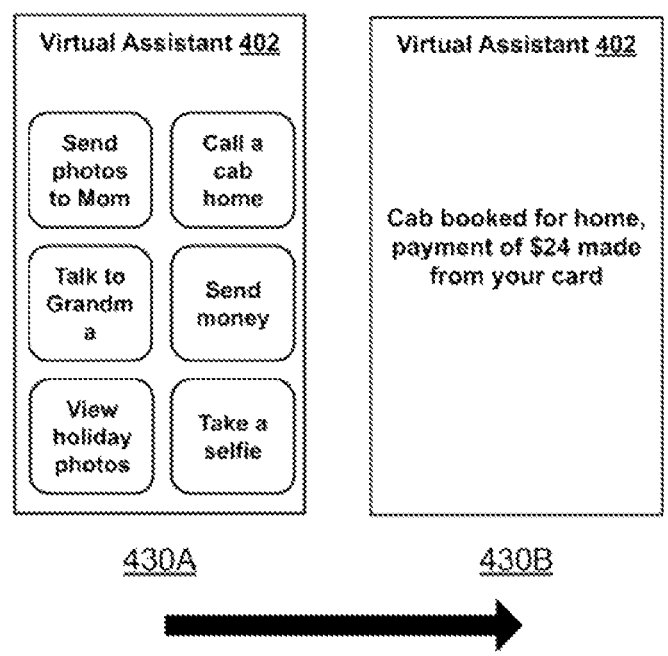

FIG. 4C illustrates execution of a different execution block, "Call a cab home." In this example, the user selects the corresponding icon from the home screen (430A) that displays a plurality of execution blocks provided by a virtual assistant (402). In response to the user selection, the execution block is run to complete the task (430B).

In this example, running the execution block may perform multiple steps to accomplish the task. For example, with user permission, the following steps may be completed—(a) determine user location, e.g., by utilizing an on-board global positioning sensor (GPS) of the user's computing device; (b) access a cab-booking application, e.g., by an app API or by programmatically navigating the app user interface and provide the user's location and the destination address (home); (c) confirm the departure time and price; and (d) make a payment from a payment method authorized by the user. The user is thus saved the effort of providing inputs for these steps as well as the cognitive burden of navigating the cab-booking app.

Further, the execution block can be parameterized and can present a simplified user interface within the virtual assistant. For example, the user location may be obtained via user input by asking a question "Where are you?" and receiving a spoken or typed response "I'm at the garden." In another example, the payment mode may be confirmed, e.g., by asking a question "How would you like to pay?" and receiving a response "credit card." Further, the user may be offered other choices to customize the journey, e.g., to book a regular or premium cab; to select or decline the offered price; etc.

In this manner, the virtual assistant can retain the customizability of cab booking, while reducing user cognitive burden. For example, the simplified user interface may be suitable when the user has limited capacity to provide input, e.g., the user cannot use a touchscreen in cold weather, but can provide voice input; when the user is unfamiliar with the interface of the cab-booking application; when the user does not read the language of the user interface of the cab-booking application; etc.

Figure 5:
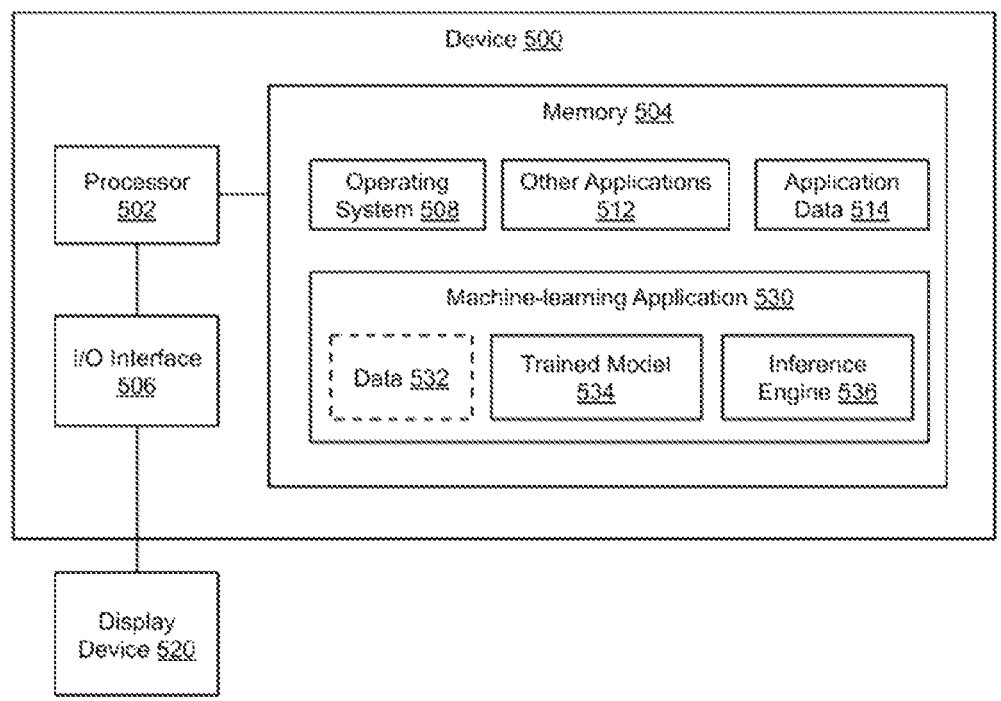
FIG. 5 is a block diagram of an example device which may be used for one or more implementations described herein.

FIG. 5 is a block diagram of an example device 500 which may be used to implement one or more features described herein. In one example, device 500 may be used to implement a client device, e.g., any of client devices 120-126 shown in FIG. 1. Alternatively, device 500 can implement a server device, e.g., server device 104 or server device 142. In some implementations, device 500 may be used to implement a client device, a server device, or both client and server devices. Device 500 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 500 includes a processor 502, a memory 504, and input/output (I/O) interface 506. Processor 502 can be one or more processors and/or processing circuits to execute program code and control basic operations of the device 500. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 502 may include one or more co-processors that implement neural-network processing. In some implementations, processor 502 may be a processor that processes data to produce probabilistic output, e.g., the output produced by processor 502 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the device 500 by the processor 502, including an operating system 508, machine-learning application 530, other applications 512, and application data 514. Other applications 512 may include applications such as a virtual assistant application, an execution block application, data display engine, web hosting engine, image display engine, notification engine, social networking engine, etc. In some implementations, the machine-learning application 530 and other applications 512 can each include instructions that enable processor 502 to perform functions described herein, e.g., some or all of the method of FIG. 3.

Other applications 512 can include, e.g., image editing applications, media display applications, communication applications, web hosting engines or applications, mapping applications, media sharing applications, shopping or financial applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application may utilize Bayesian classifiers, support vector machines, neural networks, or other learning techniques. In some implementations, machine-learning application 530 may include a trained model 534, an inference engine 536, and data 532. In some implementations, data 532 may include training data, e.g., data used to generate trained model 534. For example, training data may include any type of data such as text, images, audio, video, user interaction data, application API specifications, etc.

Training data may be obtained from any source, e.g., a data repository specifically marked for training, data for which permission is provided for use as training data for machine-learning, etc. In implementations where one or more users permit use of their respective user data to train a machine-learning model, e.g., trained model 534, training data may include such user data. In implementations where users permit use of their respective user data, data 532 may include permitted data such as a clickstream or other user interaction data, usage patterns of a computing device, user's calendar or other information, etc.

In some implementations, training data may include synthetic data generated for the purpose of training, such as data that is not based on user input or activity in the context that is being trained, e.g., data generated from simulated user journeys. In some implementations, machine-learning application 530 excludes data 532. For example, in these implementations, the trained model 534 may be generated, e.g., on a different device, and be provided as part of machine-learning application 530. In various implementations, the trained model 534 may be provided as a data file that includes a model structure or form, and associated weights. Inference engine 536 may read the data file for trained model 534 and implement a neural network with node connectivity, layers, and weights based on the model structure or form specified in trained model 534.

In some implementations, the trained model 534 may include one or more model forms or structures. For example, model forms or structures can include any type of neural-network, such as a linear network, a deep neural network that implements a plurality of layers (e.g., "hidden layers") between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers.

For example, the nodes of a first layer (e.g., input layer) may receive data as input, e.g., data 532 or application data 514. For example, when trained model 534 is a model that identifies an execution block that includes a plurality of executable units, the input data may include a clickstream or other user interaction data, application API specifications of one or more applications, user interfaces and/or user interface elements of the applications, etc. Subsequent intermediate layers may receive as input output of nodes of a previous layer per the connectivity specified in the model form or structure. These layers may also be referred to as hidden layers or latent layers.

A final layer (e.g., output layer) produces an output of the machine-learning application. For example, the output may be an execution block that includes sequence of executable units, associated semantic annotations. In some implementations, one or more parameters for the execution block may also be output. In some implementations, model form or structure also specifies a number and/or type of nodes in each layer.

In different implementations, trained model 534 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function.

In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, a sequence of operations in a user journey, etc.

In some implementations, trained model 534 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 532, to produce a result.

For example, training may include applying supervised learning techniques. In supervised learning, the training data can include a plurality of inputs and a corresponding expected output for each input. Based on a comparison of the output of the model with the expected output, values of the weights are automatically adjusted, e.g., in a manner that increases a probability that the model produces the expected output when provided similar input.

Machine-learning application 530 also includes an inference engine 536. Inference engine 536 is configured to apply the trained model 534 to data, such as application data 514, to provide an inference. In some implementations, inference engine 536 may include software code to be executed by processor 502. In some implementations, inference engine 536 may specify circuit configuration (e.g., for a programmable processor, for a field programmable gate array (FPGA), etc.) to configure processor 502 to apply the trained model. In some implementations, inference engine 536 may include software instructions, hardware instructions, or a combination. In some implementations, inference engine 536 may offer an application programming interface (API) that can be used by operating system 508 and/or other applications 512 to invoke inference engine 536, e.g., to apply trained model 534 to application data 514 to generate an inference, e.g., an executable unit or a sequence of executable units that form an execution block.

In some implementations, machine-learning application 530 may be implemented in an offline manner. In these implementations, trained model 534 may be generated in a first stage, and provided as part of machine-learning application 530. In some implementations, machine-learning application 530 may be implemented in an online manner. For example, in such implementations, an application that invokes the machine-learning application 530 (e.g., operating system 508, one or more of other applications 512) may utilize an inference produced by machine-learning application 530, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 534, e.g., to update embeddings for trained model 534.

In some implementations, machine-learning application 530 may be implemented in a manner that can adapt to particular configuration of device 500 on which the machine-learning application 530 is executed. For example, machine-learning application 530 may determine a computational graph that utilizes available computational resources, e.g., processor 502. For example, if machine-learning application 530 is implemented as a distributed application on multiple devices, machine-learning application 530 may determine computations to be carried out on individual devices in a manner that optimizes computation. In another example, machine-learning application 530 may determine that processor 502 includes a GPU with a particular number of GPU cores (e.g., 1000) and implement the inference engine accordingly (e.g., as 1000 individual processes or threads).

Any of software in memory 504 can alternatively be stored on any other suitable storage location or computer-readable medium. In addition, memory 504 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the device 500 with other systems and devices. Interfaced devices can be included as part of the device 500 or can be separate and communicate with the device 500. For example, network communication devices, storage devices (e.g., memory and/or database 106), and input/output devices can communicate via I/O interface 506. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 506 can include one or more display devices 520 that can be used to display content, e.g., images, video, and/or a user interface of an output application as described herein. Display device 520 can be connected to device 500 via local connections (e.g., display bus) and/or via networked connections and can be any suitable display device. Display device 520 can include any suitable display device such as an LCD, LED, or plasma display screen, CRT, television, monitor, touchscreen, 3-D display screen, or other visual display device. For example, display device 520 can be a flat display screen provided on a mobile device, multiple display screens provided in a goggles or headset device, or a monitor screen for a computer device.

The I/O interface 506 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 5 shows one block for each of processor 502, memory 504, I/O interface 506, and software blocks 508, 512, and 530. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While some components are described as performing blocks and operations as described in some implementations herein, any suitable component or combination of components of environment 100, device 500, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method to provide an assistive user interface, the method comprising:
   identifying, by one or more processors, a user journey that includes a plurality of user journey operations to perform a computer-mediated task by analyzing data comprising user interaction data that describes the user journey operations;
   analyzing, by the one or more processors, user interface (UI) elements of a plurality of software applications and determining a plurality of executable units of the software applications associated with the UI elements, wherein the plurality of executable units are operative to perform unit operations for the plurality of software applications, wherein the analyzing and determining includes, for each UI element:
      recognizing a label of the UI element, wherein recognizing the label of the UI element includes using, by the one or more processors, image analysis and recognition techniques or optical character recognition (OCR) techniques to recognize the label of the UI element as a text label or graphical content; and
      mapping the UI element to a respective executable unit of the plurality of executable units based on matching the label to one or more unit operations operative to be performed by the respective executable unit that correspond to the label;
   analyzing, by the one or more processors, application programming interface (API) definitions of the plurality of software applications and determining the plurality of executable units of the software applications that are associated with the API definitions and with the UI elements, wherein the analyzing and determining comprises, for each API definition:
      obtaining one or more semantic annotations associated with the API definition, wherein the one or more semantic annotations include one or more text labels that semantically describe one or more operations of an API associated with the API definition; and
      mapping the API associated with the API definition to a respective executable unit of the plurality of executable units based on matching the semantic annotations to at least one unit operation operative to be performed by the respective executable unit that corresponds to the semantic annotations;
   based on the user journey and the plurality of executable units, generating, by the one or more processors, an execution block that defines a sequence of two or more particular executable units of the plurality of executable units and wherein execution of the execution block completes the computer-mediated task, wherein generating the execution block includes mapping, by the one or more processors, the plurality of user journey operations of the user journey to the two or more particular executable units that are operative to perform the unit operations that correspond to the user journey operations; and
   providing the assistive user interface that includes the execution block.

2. The computer-implemented method of claim 1, further comprising:
   receiving user input indicative of activation of the execution block; and
   in response to the user input, running the execution block.

3. The computer-implemented method of claim 2, further comprising:
   providing a prompt to request a parameter for a particular executable unit of the sequence; and
   receiving a user response that includes the parameter, wherein running the execution block is based on the parameter.

4. The computer-implemented method of claim 2, wherein the assistive user interface is provided by a virtual assistant application, and wherein running the execution block comprises invoking, by the virtual assistant application, respective software applications associated with each of the two or more particular executable units of the plurality of executable units.

5. The computer-implemented method of claim 4, wherein the invoking comprises:
automatically navigating, by the virtual assistant application, a user interface provided by the respective software applications, wherein the automatically navigating comprises:
recognizing the user interface provided by the respective software applications, wherein recognizing the user interface includes identifying particular UI elements in the user interface that match user interface information stored in association with the plurality of executable units; and
based on the recognizing, automatically providing one or more of: a click input, a touch input, a voice input, or a keyboard input to at least one of the respective software applications via one or more identified UI elements of the user interface.

6. The computer-implemented method of claim 1, wherein the UI elements include display UI elements, and wherein analyzing the display UI elements comprises:
recognizing one or more characteristics of each display UI element, wherein the one or more characteristics include one or more of: a shape, a size, a placement, a text, or a graphical content of each display UI element; and
mapping the display UI element to the respective executable unit based on the one or more recognized characteristics corresponding to the one or more unit operations.

7. The computer-implemented method of claim 1, wherein the UI elements include audio UI elements, and wherein analyzing the UI elements comprises, for each audio UI element:
utilizing speech recognition techniques to detect one or more of: a tone of the audio UI element or a text of the audio UI element; and
mapping the audio UI element to the respective executable unit based on the tone or the text corresponding to the one or more unit operations.

8. The computer-implemented method of claim 1, wherein the user interaction data includes a plurality of user interaction events, and analyzing the user interaction data comprises:
classifying the plurality of user interaction events into a plurality of event clusters, wherein each of the event clusters includes one or more of the user interaction events,
wherein mapping the plurality of user journey operations of the user journey to the two or more particular executable units is based on the plurality of event clusters, wherein each of the plurality of event clusters is mapped to a respective executable unit of the two or more particular executable units.

9. The computer-implemented method of claim 8, wherein the plurality of user interaction events includes a start event indicative of a start of the computer-mediated task and an end event indicative of an end of the computer-mediated task.

10. The computer-implemented method of claim 8, wherein the plurality of user interaction events includes at least one event associated with each of a first software application and a second software application of the plurality of software applications.

11. The computer-implemented method of claim 1, wherein providing the assistive user interface comprises:
determining a use context based on one or more of: system state of a client computing device or patterns of use associated with the client computing device,
wherein the execution block is selected from a plurality of execution blocks and provided in the assistive user interface by the one or more processors in response to determining that the execution block of the computer-mediated task is associated with the use context of the client computing device.

12. A computing device comprising:
a processor; and
a memory coupled to the processor, with instructions stored thereon that, when executed by the processor, cause the processor to perform operations comprising:
identifying a user journey that includes a plurality of user journey operations to perform a computer-mediated task by analyzing data comprising user interaction data that describes the user journey operations;
analyzing application programming interface (API) definitions of a plurality of software applications and determining a plurality of executable units of the software applications associated with the API definitions, wherein the plurality of executable units are operative to perform unit operations for the plurality of software applications, wherein the analyzing and determining includes, for each API definition:
obtaining one or more semantic annotations associated with the API definition, wherein the one or more semantic annotations include one or more text labels that semantically describe one or more operations of an API associated with the API definition; and
mapping the API associated with the API definition to a respective executable unit of the plurality of executable units based on matching the semantic annotations to one or more unit operations operative to be performed by the respective executable unit that correspond to the semantic annotations;
analyzing user interface (UI) elements of the plurality of software applications and determining the plurality of executable units of the software applications that are associated with the UI elements and the API definitions, wherein the analyzing and determining includes, for each UI element:
recognizing a label of the UI element using image analysis and recognition techniques or optical character recognition (OCR) techniques; and
mapping the UI element to a respective executable unit of the plurality of executable units based on matching the label to one or more unit operations operative to be performed by the respective executable unit that correspond to the label;
based on the user journey and the plurality of executable units, generating an execution block that defines a sequence of two or more particular executable units of the plurality of executable units and wherein execution of the execution block completes the computer-mediated task, wherein generating the execution block includes mapping the plurality of user journey operations of the user journey to the two or more particular executable units that are operative to perform the unit operations that correspond to the user journey operations; and
providing an assistive user interface that includes the execution block.

13. The computing device of claim 12, wherein the user interaction data includes a plurality of user interaction events, and wherein the operation of analyzing the user interaction data comprises:
   classifying the plurality of user interaction events into a plurality of event clusters, wherein each of the event clusters includes one or more of the user interaction events,
   wherein mapping the plurality of user journey operations of the user journey to the two or more particular executable units is based on the plurality of event clusters, wherein each of the plurality of event clusters is mapped to a respective executable unit of the two or more particular executable units.

14. The computing device of claim 12, wherein the computing device is a server, wherein providing the assistive user interface comprises:
   causing the assistive user interface to be displayed by a client computing device, different from the server; and
   determining a use context of the client computing device, based on one or more of: system state of the client computing device or patterns of use associated with the client computing device,
   wherein the execution block is selected from a plurality of execution blocks and provided in the assistive user interface in response to determining that the execution block of the computer-mediated task is associated with the use context of the client computing device.

15. The computing device of claim 12, wherein the operations further comprise:
   receiving user input indicative of activation of the execution block; and
   in response to the user input, running the execution block, wherein the assistive user interface is provided by a virtual assistant application, and wherein running the execution block comprises invoking, by the virtual assistant application, respective software applications associated with each of the two or more particular executable units of the plurality of executable units,
   wherein the invoking comprises performing, by the virtual assistant application, an API call using the API definitions of the respective software applications.

16. A non-transitory computer-readable medium with instructions stored thereon that, when executed by a processor, cause the processor to perform operations comprising:
   identifying a user journey that includes a plurality of user journey operations to perform a computer-mediated task by analyzing data comprising user interaction data that describes the user journey operations;
   analyzing user interface (UI) elements of a plurality of software applications and determining a plurality of executable units of the software applications associated with the UI elements, wherein the plurality of executable units are operative to perform unit operations for the plurality of software applications, wherein the analyzing and determining includes, for each UI element:
      recognizing a label of the UI element, wherein recognizing the label of the UI element includes using image analysis and recognition techniques or optical character recognition (OCR) techniques to recognize the label of the UI element as a text label or graphical content; and
      mapping the UI element to a respective executable unit of the plurality of executable units based on matching the label to one or more unit operations operative to be performed by the respective executable unit that correspond to the label;
   analyzing application programming interface (API) definitions of the plurality of software applications and determining the plurality of executable units of the software applications that are associated with the API definitions and with the UI elements, wherein the analyzing and determining comprises, for each API definition:
      obtaining one or more semantic annotations associated with the API definition, wherein the one or more semantic annotations include one or more text labels that semantically describe one or more operations of an API associated with the API definition; and
      mapping the API associated with the API definition to a respective executable unit of the plurality of executable units based on matching the semantic annotations to at least one unit operation operative to be performed by the respective executable unit that corresponds to the semantic annotations;
   based on the user journey and the plurality of executable units, generating an execution block that defines a sequence of two or more particular executable units of the plurality of executable units and wherein execution of the execution block completes the computer-mediated task, wherein generating the execution block includes mapping the plurality of user journey operations of the user journey to the two or more particular executable units that are operative to perform the unit operations that correspond to the user journey operations; and
   providing an assistive user interface that includes the execution block.

17. The non-transitory computer-readable medium of claim 16, wherein the operation of recognizing the label of the UI element includes using image analysis and recognition techniques or optical character recognition (OCR) techniques to recognize the label of the UI element as a text label or graphical content, and wherein the operation of analyzing the UI elements comprises:
   recognizing one or more characteristics of each UI element, wherein the one or more characteristics include one or more of: a shape, a size, a placement, a text, or a graphical content of each UI element; and
   mapping the UI element to the respective executable unit based on the one or more recognized characteristics corresponding to the one or more unit operations.

\* \* \* \* \*